(12) United States Patent
Anand

(10) Patent No.: US 6,576,056 B2
(45) Date of Patent: Jun. 10, 2003

(54) TIP ASSEMBLY FOR EXTRUSION DIE ASSEMBLY

(76) Inventor: Vijay Anand, 1894 Vermack Ct., Dunwoody, GA (US) 30338

( * ) Notice: Subject to any disclaimer, the term of this patent is extended or adjusted under 35 U.S.C. 154(b) by 97 days.

(21) Appl. No.: 09/794,372

(22) Filed: Feb. 27, 2001

(65) Prior Publication Data

US 2002/0179009 A1 Dec. 5, 2002

Related U.S. Application Data

(60) Provisional application No. 60/222,746, filed on Aug. 3, 2000.

(51) Int. Cl.[7] ................................................. B05C 3/12
(52) U.S. Cl. ..................... 118/125; 118/405; 118/410; 118/419; 118/420; 118/DIG. 18; 425/113; 425/467
(58) Field of Search ................. 118/405, 410, 118/419, 420, DIG. 18, 125; 425/113, 467

(56) References Cited

U.S. PATENT DOCUMENTS

| 4,046,103 A | * | 9/1977 | Yakuboff | ................... | 118/125 |
| 4,426,954 A | * | 1/1984 | Keller | ........................ | 118/125 |
| 4,521,173 A | * | 6/1985 | Hilker et al. | ................ | 425/113 |
| 5,316,583 A | | 5/1994 | Milliman | | |
| 5,565,218 A | | 10/1996 | Brown et al. | | |
| 5,749,971 A | * | 5/1998 | Ni | .............................. | 118/407 |

* cited by examiner

*Primary Examiner*—Laura Edwards
(74) *Attorney, Agent, or Firm*—Laurence S. Roach, Esq.; Jaeckle Fleischmann & Mugel, LLP

(57) ABSTRACT

A tip assembly includes a tip having a nose portion. The tip defines a central bore. The nose portion includes a lip portion and defines a counterbore. The counterbore has a counterbore side wall and a seat surface. The counterbore is contiguous with the central bore. An insert member includes an inner surface, an outer surface and a side wall. The inner surface is opposite the outer surface. The side wall interconnects the inner surface and the outer surface. The insert defines a central aperture that extends from the inner surface to the outer surface. The insert is disposed within the counterbore such that the central aperture is substantially concentric with the central bore of the tip. The lip portion of the tip engages the outer surface of the insert.

12 Claims, 3 Drawing Sheets

TIP ASSEMBLY FOR EXTRUSION DIE ASSEMBLY

CROSS REFERENCE TO RELATED APPLICATIONS

This application claims the benefit of U.S. Provisional Patent Application Ser. No. 60/222,746, filed Aug. 3, 2000.

FIELD OF THE INVENTION

The present invention relates generally to an apparatus for the application of a coating material to a filament, such as, for example, a wire or optical fiber. More particularly, the present invention relates to cross-head die assemblies for the application of a coating material to a filament.

BACKGROUND OF THE INVENTION

Cross-head die assemblies are used in applying a coating material, such as, for example, molten plastic, to a substantially continuous filamentary element. Cross-head die assemblies generally include a die member and a tip. The die member is an elongate frustoconical body that defines an axial bore therethrough. The die member is received within and is held by a die holder. The tip is placed into operable relation with, such as, for example, received within, a tip holder, and both are received within the die holder such that the tip is axially-spaced relative to the die member. The tip also defines an axial bore therethrough. The tip holder, or core tube, functions to ensure an even flow of coating material around the tip and into the space between the tip and the die member to thereby ensure an even distribution of coating on the filamentary member. The filamentary member is drawn axially through the axial bore in the tip. The tip functions to guide the filamentary element and establish a consistent axis of pull for the filamentary element. The draw of the filamentary element continues in an axial direction from the tip into and through the coating material contained within the space separating the tip and the die member. The filamentary element is then drawn axially through the die orifice in the die member. The difference between the diameters in the die orifice and the filamentary member determines the thickness of the coating material applied to, or remaining on, the filamentary element. Thus, the die orifice meters or removes coating material from the filamentary element.

In some crosshead die assemblies, the axial bore of the die holder is variously tapered. The outer surface of the die member is tapered to correspond to a particular section of the tapered axial bore of the die holder. When inserted into the tapered axial bore of the die holder, the corresponding taper of the die member acts to establish and maintain axial alignment of the components relative to each other. Similarly, the axial bore of the tip holder and the corresponding taper of the axial bore of the die holder cooperate to establish and maintain axial alignment of the components relative to one another.

Axial alignment of the crosshead die components and the filamentary element is critical in the process of applying a coating of material to a filamentary element. More particularly, axial alignment of the filamentary member and the die orifice is critical to producing a consistent thickness of coating material around the circumference of the filamentary element. As the filamentary element is drawn axially through the tip, friction between the wire and tip results in wear and degradation of the tip. Furthermore, typical coating operations, such as, for example, wire coating, run at speeds well in excess of one-thousand feet of wire per minute. Such pull speeds contribute to additional friction and the buildup of heat in the tip. The wear and tear on the tip permits the wire to depart from concentricity with the die orifice, thereby resulting in a loss of axial alignment of the wire relative to the die orifice, a decrease in the quality of the coating layer and, thus, a decrease in the useful life of a tip. Once the tip has incurred a certain degree of wear and tear, and thus a reduction in its ability to maintain the filamentary member in concentric relation with the die orifice, the tip must either be used for the application of coating layers which do not require tight tolerances or concentric coatings, or the tip must be remachined or recycled.

In order to reduce the frictional wear of the tip and increase the useful life thereof, hardened inserts have been variously placed in relation to the tip. These inserts generally are ring-shaped members and include a central bore through which the filamentary member or wire is drawn. Such inserts are typically placed anywhere from the rear of the tip holder to the outside surface of the tip itself, and are permanently affixed to the tip or tip holder such that the central bore of the insert is substantially concentric with the filamentary axis of pull. Alternatively, the die assembly may include a tip having two or more parts, or of multi-piece construction. The hardened insert is disposed between the tip pieces, which are then attached together, such as, for example, by welding, brazing, or threading engagement.

The process of affixing the insert to the tip introduces a new set of challenges and inefficiencies. If the insert itself is welded or brazed to the end of the tip, the diameter and thickness of the insert increase the nose diameter of the tip. The increased tip nose diameter results in the tip being spaced farther away from the die member, thereby reducing the quality and concentricity of the applied coating. If the insert itself is welded or brazed to the tip at any location other than the end of the tip, the problem of increased tip nose diameter is eliminated. However, the high temperature of the welding and/or brazing process may result in property changes, cracks or other degradation in the insert.

If the insert is constructed of a material that is not easily welded or brazed, or otherwise affixed to the tip, the insert may be accommodated within a tip having two or more pieces. For example, the insert can be sandwiched between the two tip pieces, which are then attached together by welding or brazing. However, the insert is still subjected to the heat from the welding or brazing process which potentially results in property changes, cracks or other degradation in the insert. If the insert is sandwiched between two tip pieces which are then threaded together, maintaining the critical alignment of the central bore of the insert with the axis of pull of the filamentary element is tenuous, and often compromised during, for example, assembly, cleaning or disassembly.

Therefore, what is needed in the art is a tip having increased resistance to wear and tear due to friction.

Furthermore, what is needed in the art is a tip that does not require remachining or recycling after its useful life has expired.

Even further, what is needed in the art is a tip that includes a hardened insert that has not been damaged or the properties thereof altered due to exposure to the high heat of welding, brazing or other attachment processes.

Still further, what is needed in the art is a tip that includes a hardened insert that remains in a substantially concentric relation with the filamentary member axis of pull during assembly, disassembly and cleaning.

Yet further, what is needed in the art is a method of attaching an insert that does not require welding or brazing of the insert to the tip.

Lastly, what is needed in the art is a method of attaching an insert to a tip without the need to expose the tip to the high heat of a welding, brazing or other attachment process.

SUMMARY OF THE INVENTION

The present invention provides a tip assembly for use with a cross-head die assembly.

The present invention comprises, in one form thereof, a tip having a nose portion. The tip defines a central bore. The nose portion includes a lip portion and defines a counterbore. The counterbore has a counterbore side wall and a seat surface. The counterbore is contiguous with the central bore. An insert member includes an inner surface, an outer surface and a side wall. The inner surface is opposite the outer surface. The side wall interconnects the inner surface and the outer surface. The insert defines a central aperture that extends from the inner surface to the outer surface. The insert is disposed within the counterbore such that the central aperture is substantially concentric with the central bore of the tip. The lip portion of the tip engages the outer surface of the insert.

An advantage of the present invention is the tip assembly has an increased resistance to wear and tear due to friction.

A farther advantage of the present invention is remachining or recycling of the tip due to wear and tear is not required.

A still farther advantage of the present invention is that neither the insert or tip is exposed to the high heat of welding, brazing or other attachment processes during assembly.

An even further advantage of the present invention is alignment of the insert with the filamentary member axis of pull is not compromised by assembly, disassembly or cleaning.

BRIEF DESCRIPTION OF THE DRAWINGS

The above-mentioned and other features and advantages of this invention, and the manner of attaining them, will become apparent and be more completely understood by reference to the following description of one embodiment of the invention when read in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
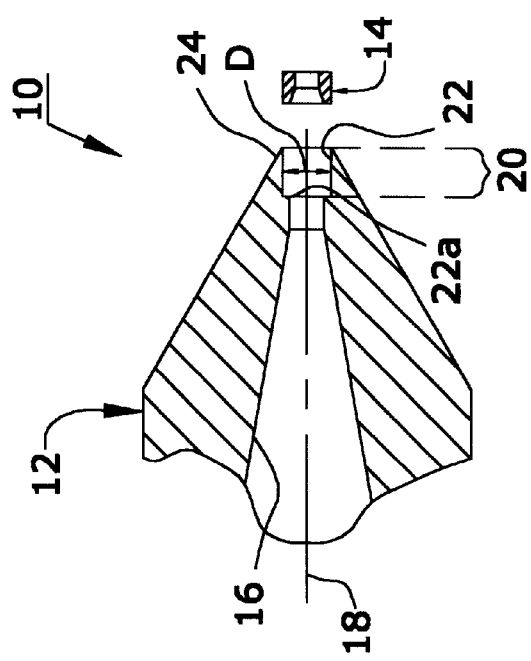
FIG. 1 is a longitudinally-sectioned exploded view of one embodiment of a tip assembly of the present invention.

Referring now to the drawings and particularly to FIG. 1, there is shown one embodiment of a tip assembly of the present invention. Tip assembly 10 includes tip 12 and insert 14.

Tip 12 defines axial bore 16, through which a filamentary member (not shown) to be coated is drawn. Bore 16 is substantially concentric with central axis 18 of tip 12. Tip 12 includes nose portion 20, which defines a counterbore 22. Counterbore 22 is substantially concentric with central axis 18, and is thus substantially concentric relative to and is contiguous with bore 16. Counterbore 22 is configured with, for example, a widened-diameter D relative to bore 16. Counterbore 22 is circumferentially bordered by lip portion 24 of nose portion 20. Seat 22a is defined at the intersection of counterbore 22 and bore 16. Tip 12 is constructed of, for example, steel or other suitable material.

Figure 4:
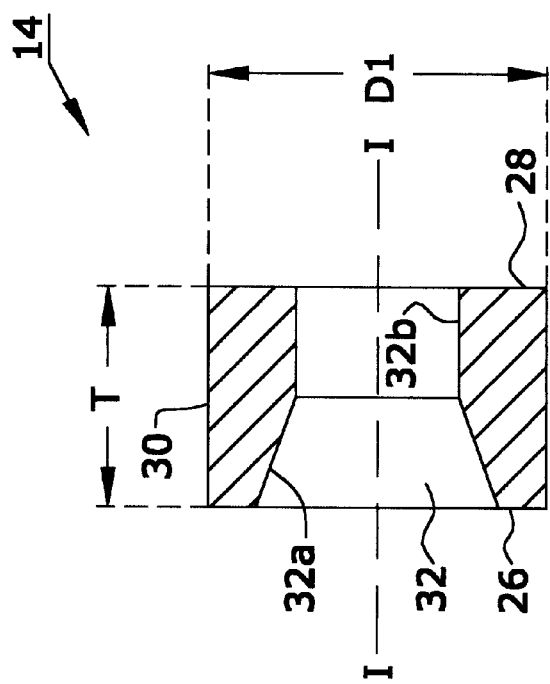
FIG. 4 is a longitudinally-sectioned view of one embodiment of the insert of FIG. 1.

As best seen in FIG. 4, insert 14 includes inner face 26, outer face 28, and substantially cylindrical outer wall 30 having a thickness T. Insert 14 has a diameter D1 and a central axis I. Insert 14 defines central aperture 32 therethrough. Central aperture 32 extends axially from inner face 26 through to outer face 28. Central aperture 32 is substantially concentric relative to central axis I of insert 14. Central aperture 32 includes wide diameter portion 32a and narrow diameter portion 32b. Wide diameter portion 32a of central aperture 32 opens onto inner face 26 of insert 14 and extends inward therefrom in a direction toward outer face 26. In the embodiment shown, wide diameter portion 32a is tapered, i.e., wide diameter portion 32a tapers at a substantially constant angle or rate from a relatively wide diameter proximate outer face 26 to a relatively narrow diameter proximate to narrow diameter portion 32a. However, it is to be understood that wide diameter portion 32a can be alternately configured, such as, for example, to taper at a varying angle relative to central axis I. Narrow diameter portion 32b opens onto outer face 28, and extends inward therefrom in a direction toward inner face 26. Narrow portion 26b and wide portion 26a are contiguous and concentric relative to each other, and relative to central axis I of insert 14.

Insert 14 may be constructed of any suitable material, such as, for example, synthetic diamond, other suitable non-metallic materials, and metals. The method of the present invention is especially suited for use with inserts which are constructed of materials, such as, for example, synthetic diamond or other non-metallic materials, that are not generally considered suitable for attachment through the use of a brazing and/or welding process. Thus, the method of the present invention is suited for placing a conventional tip into operable relation with either a conventional metal insert or a non-metallic insert constructed of the synthetic materials mentioned above or of other non-metallic materials.

Figure 2:
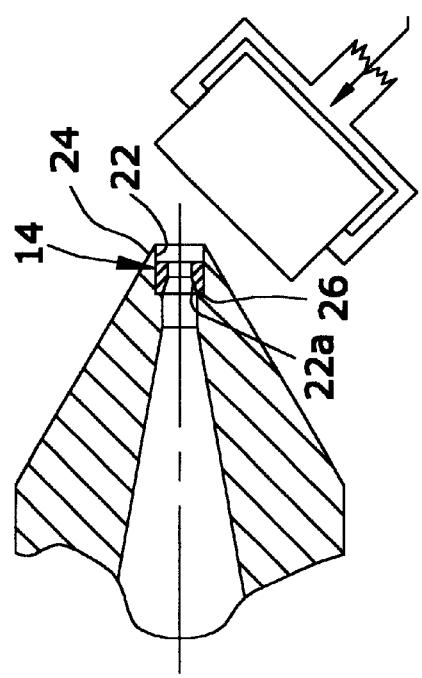
FIG. 2 is a longitudinally-sectioned view of the tip assembly of FIG. 1 in a partially-assembled condition.

As best shown in FIG. 2, insert 14 is received within counterbore 22 such that inner face 26 thereof abuttingly engages seat 22a of counterbore 22. With inner face 26 in abutting engagement with seat 22a, central axis I of insert 14 is substantially concentric with central axis 18 of tip 12, and thus central aperture 32 of insert 14 is substantially concentric relative to central bore 16 of tip 12. Outer wall 30 of insert 14 is of a predetermined diameter such that insert 14 is snugly received within counterbore 22. By closely matching diameter D of counterbore 22 and diameter D1 of insert 14, movement of insert 14 in a direction generally perpendicular to central axis 18 of tip 12 is substantially precluded. Thus, concentricity of central aperture 32 of insert 14 and central bore 16 of tip 12 is established and maintained. Thickness T of outer wall 30 is of a predetermined dimension such that insert 14 is entirely disposed within counterbore 22, and such that outer face 28 of insert 14 is disposed a predetermined distance from the outside edge (not referenced) of lip portion 24 of tip 12.

Figure 3:
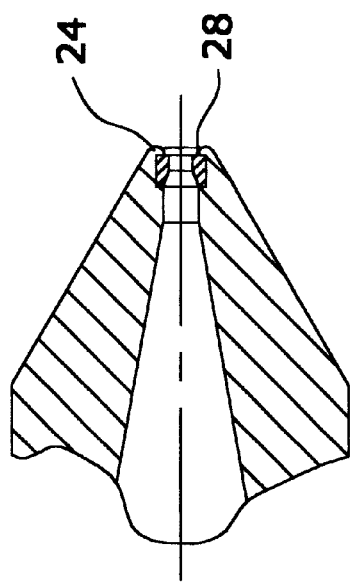
FIG. 3 is a longitudinally-sectioned view of the tip assembly of FIG. 1 in a fully-assembled condition.

As best shown in FIG. 3, the axial position of insert 14 relative to tip 12 is fixed by folding or rolling lip portion 24 over and into abutting engagement with outer face 28 of insert 14. The rolling of lip portion 24 is accomplished, such as, for example, by using a roller or rod constructed of a hard material to flow the lip over and onto outer face 28 of insert 14. The use of a roller eliminates the elevated temperatures used during, for example, a welding or brazing process, and thereby substantially eliminates damage or degradation to tip 12 and insert 14.

Figure 5:
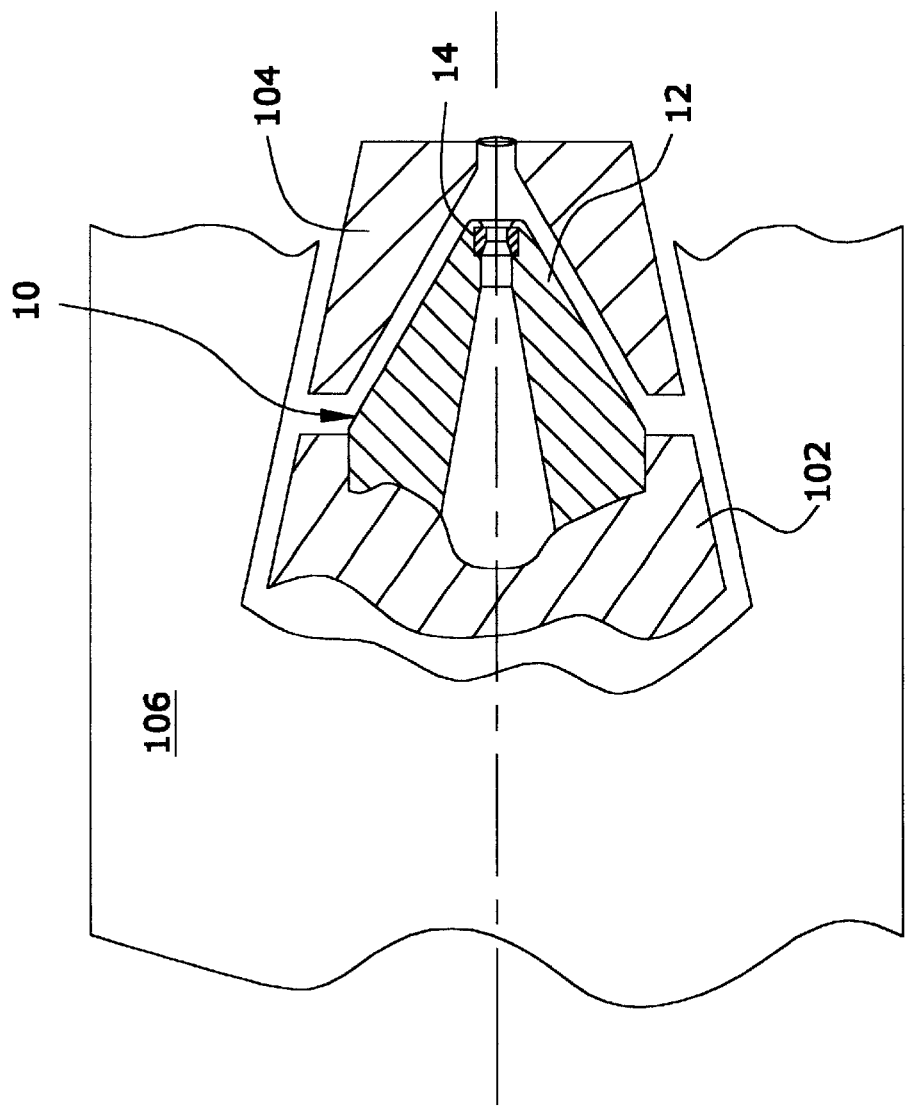
FIG. 5 is a longitudinally-sectioned view of a cross-head die assembly with the tip assembly of FIG. 1.

In use, and with reference to FIG. 5, tip assembly 10 is placed into operable relation with an exemplary cross head die assembly 100. More particularly, the end (not referenced) of tip 12 that is opposite nose portion 20 is placed into operable relation, such as, for example, received within tip holder 102. Nose portion 20 is placed into operable relation, such as, for example, received within, die member 104. Each of tip assembly 10, tip holder 102, and die member 104 are then placed into operable relation, such as, for example, received within, die holder 106. In the embodiment shown, tip assembly 10 is shown operably related to cross head die assembly 100, which is one example of a cross head die assembly. However, it is to be understood that tip assembly 10 can be configured for use with a variety of cross head die assemblies of varying and different configurations.

In the embodiment shown, tip assembly 10 is described as being for use with a cross-head die assembly. However, it is to be understood that the tip assembly of the present invention can be alternately configured, such as, for example, for use with an in-line head or other variously configured assemblies for applying coatings to a variety of filamentary members.

In the embodiment shown, central bore 16 of tip 12 is of a varying diameter. More particularly, the diameter of central bore 16 varies from a wider diameter portion to a narrow diameter portion proximate to nose portion 20. However, it is to be understood that central bore 16 may be alternately configured, such as, for example, as having a constant diameter or a series of stepped, rather than continuously varying, diameters.

In the embodiment shown, central aperture 32 of insert 14 includes a wide diameter portion 32a and narrow diameter portion 32b. However, it is to be understood that central aperture 32 may be alternately configured, such as, for example, a constant diameter aperture or a constantly varying diameter aperture.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A cross head die assembly, comprising:
   a die holder;
   a tip holder disposed at least partially within said die holder;
   a tip assembly, comprising:
      a tip received at least partially within said tip holder, said tip having a nose portion, said tip defining a central bore, said nose portion including a lip portion and defining a counterbore, said counterbore having a counterbore side wall and a seat surface, said counterbore being contiguous with said central bore; and
      an insert member having an inner surface, an outer surface and a side wall, said inner surface being opposite said outer surface, said side wall interconnecting said inner surface and said outer surface, said insert defining a central aperture extending from said inner surface to said outer surface, said insert disposed within said counterbore such that said central aperture is substantially concentric with said central bore of said tip, said lip portion of said tip engaging said outer surface of said insert; and
   a die member received at least partially within said die holder, said tip being received at least partially within said die member.

2. The die assembly of claim 1, wherein said insert is constructed of a non-metallic material.

3. The die assembly of claim 1, wherein said insert is constructed of a material comprising synthetic diamond.

4. The die assembly of claim 1, wherein said insert is constructed of a material that is not capable of attachment to said tip through one of a brazing and welding process.

5. The die assembly of claim 1, wherein said insert is constructed of a material that is capable of being attached to said tip through one of a brazing and welding process.

6. A tip assembly for use with a cross head die assembly, said cross head die assembly having a die holder, a tip holder disposed within said die holder, said tip assembly comprising:
   a tip configured for being disposed at least partially within said tip holder, said tip having a nose portion, said tip defining a central bore, said nose portion including a lip portion and defining a counterbore, said counterbore having a counterbore side wall and a seat surface, said counterbore being contiguous with said central bore; and
   an insert member having an inner surface, an outer surface and a side wall, said inner surface being opposite said outer surface, said side wall interconnecting said inner surface and said outer surface, said insert defining a central aperture extending from said inner surface to said outer surface, said insert disposed within said counterbore such that said central aperture is substantially concentric with said central bore of said tip, said lip portion of said tip engaging said outer surface of said insert.

7. The tip assembly of claim 6, wherein said insert is constructed of a non-metallic material.

8. The tip assembly of claim 6, wherein said insert is constructed of a material comprising synthetic diamond.

9. The tip assembly of claim 6, wherein said insert is constructed of a material that is not capable of attachment to said tip through one of a brazing and welding process.

10. The tip assembly of claim 6, wherein said insert is constructed of a material that is capable of being attached to said tip through one of a brazing and welding process.

11. The tip assembly of claim 6, wherein said central aperture of said insert includes a first portion and a second portion, each of said first portion and said second portion having a respective first and second diameter, at least one of said first and second diameter having a taper in an axial direction.

12. A cross head die assembly having a central axis and configured for applying a coating medium to a filamentary member moving through said cross head die assembly in a direction of travel, said cross head die assembly comprising:

a die holder;

a tip holder disposed within said die holder;

a tip assembly including a tip and an insert member, said tip disposed at least partially within said tip holder, said tip having a nose portion and defining an axial bore, said axial bore being substantially coaxial relative to said central axis, said nose portion defining a counterbore contiguous and substantially coaxial with said central axis, said insert member being disposed within said counterbore and defining a central aperture, said central aperture being substantially concentric relative to said central axis;

a die member received at least partially within said die holder, said die member defining an exit orifice that is substantially coaxial relative to said central axis, said tip being received at least partially within said die member such that said central aperture of said insert is substantially coaxial relative to said central axis; and a coating material application chamber defined at least in part between said tip and said die holder such that said tip is disposed prior to said coating material application chamber and said die member relative to said direction of travel of said filamentary member.

\* \* \* \* \*